United States Patent [19]
Thiele

[11] 3,805,776
[45]*Apr. 23, 1974

[54] TREATMENT OF NON-SURGICAL OSTEOLYSIS OF BONE

[76] Inventor: Geraldine H. Thiele, Rt. 1 Box 12, Windber, Pa. 15963

[*] Notice: The portion of the term of this patent subsequent to June 26, 1990, has been disclaimed.

[22] Filed: Aug. 25, 1972

[21] Appl. No.: 283,662

Related U.S. Application Data

[63] Continuation-in-part of Ser. No. 113,362, Feb. 8, 1971, Pat. No. 3,741,204, and a continuation-in-part of Ser. No. 123,830, March 12, 1971.

[52] U.S. Cl............. 128/92 G, 128/334 R, 424/318
[51] Int. Cl...................... A61f 05/01, A61b 17/18
[58] Field of Search.... 128/92 R, 92 G, 215, 334 R; 424/318

[56] References Cited
UNITED STATES PATENTS

| | | | |
|---|---|---|---|
| 3,030,951 | 4/1962 | Mandarino | 128/92 G |
| 3,223,083 | 12/1965 | Cobey | 128/92 R |
| 3,741,204 | 6/1973 | Thiele | 128/92 G |

*Primary Examiner*—Dalton L. Truluck
*Attorney, Agent, or Firm*—Christen & Sabol; Virgil H. Marsh

[57] ABSTRACT

This invention involves a process for stopping and reversing demineralization which has occurred around screws, pins and other metal inserts which have been placed in bones. The process causes the demineralized region to "heal" in that healthy bone results. The process includes injecting at least one dosage of a liquefied composition containing a non-necrotic vascular sclerosing agent into the site of the demineralization. The preferred non-necrotic vascular sclerosing agent is sodium oleate. The process is normally used to treat demineralization resulting from screws which have been inserted in fractured bones. This invention can be used to treat both man and animal.

Before, during and after the above treatment is completed, the fractures and nonunions of bones can more readily be healed without muscle atrophy, etc., by injecting a liquefied composition containing a non-necrotic vascular sclerosing agent (e.g., sodium oleate) into the site of the fracture. No cast is used.

23 Claims, 3 Drawing Figures

PATENTED APR 23 1974 3,805,776

TREATMENT OF NON-SURGICAL OSTEOLYSIS OF BONE

This application is a continuation-in-part of applicant's copending application Ser. No. 113,362 now U.S. Pat. No. 3,741,204, which was filed on Feb. 8, 1971, and is a continuation-in-part of applicant's copending application Ser. No. 123,830 which was filed on Mar. 12, 1971.

BROAD DESCRIPTION OF THIS INVENTION

Bone is composed of living cells and an intercellular matrix that is impregnated with calcium salts. Calcium phosphate makes up about 80 percent of the mineral matter, with the remainder composed largely of calcium carbonate and magnesium phosphate. One hundred cc. of bone contain 10,000 mg. of calcium, as compared with 6 mg. of calcium per 100 cc. of blood. Thus, bone serves as a mineral reservoir which is either constantly being replenished or constantly being depleted.

Adult bone cells are found in the lacunae within the matrix of the bone. Throughout life, osteoblasts are found in the deep layer of periosteum surrounding the bone, in Haversian canals, and in the endosteum. These cells function in bone growth and in fracture and bone repair.

Ossification is the formation of true bont by the deposition of calcium salts in a matrix of osteoid tissue.

Bone (even in a fresh carcass) appears hard, dense, inelastic, and almost lifeless. Actually bone as a tissue is extremely responsive to environmental changes in blood supply and to changes in nutrition. Bone can decrease in size (atrophy), increase in size (hypertrophy), repair breaks, and rearrange its internal structure to best resist stresses and strains. Under both normal and pathological conditions, bone can normally reshape itself according to good engineering principles to sustain a maximum of stress with a minimum of bone tissue.

Osteolysis is the softening, absorption and destruction of bony tissue. It is also commonly termed demineralization. When metal screws, pins and the like are used in bone, osteolysis often occurs i.e., the bone rejects the metal screws, etc. Calcium which is the major component of bone, migrates from the region of the bone around the screws and deposits on the screws. The region from which the migration occurs becomes soft and spongy. The ossifluent regions are returned to normal bone by treatment using the process of this invention.

This invention involves a process for the treatment of osteolysis of the region of bone around a metal object in or contacting the bone. The metal object is usually a screw or pin which has been inserted in bone to hold a fracture, non-union or break together. The process includes injecting at least one dosage of a non-necrotic vascular sclerosing agent and a liquid carrier into the ossifluent region around the metal object. The process is a substantially complete curing (return to normal, healthy bone) of the ossifluent region.

The preferred composition is comprised of 5 percent of sodium oleate, 1.5 percent of ethyl alcohol, enough disodium hydrogen phosphate to adjust the pH to 9.8, and the remainder water.

This invention can be used to treat man and/or animal. This invention is particularly useful in the treatment of racing and troting horses; can be used to treat, for example, all equine, e.g., horses and mules, donkeys, sheep, goats, swine, bovines, e.g., oxen and cows, dogs, cats, etc.

DETAILED DESCRIPTION OF THIS INVENTION

Figure 1:
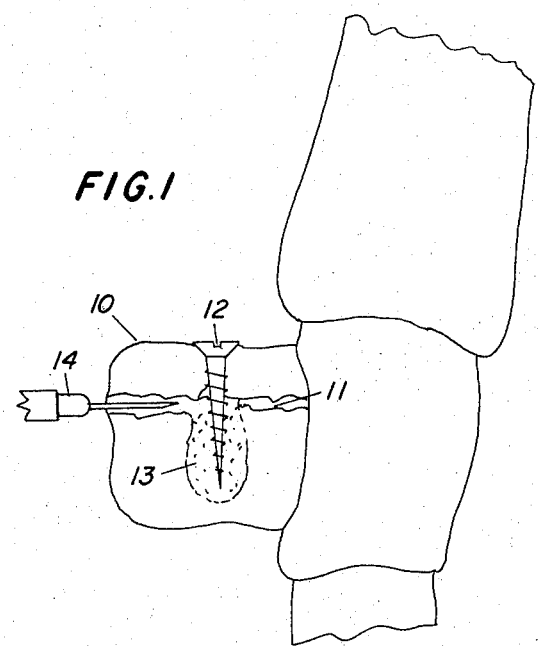

In FIG. 1, the bone is located at 10, the locus of the fracture being indicated at 11. Screw 12 holds the fracture together. The demineralized or ossifluent region around screw 12 is indicated by 13. 14 is an exploratory hypodermic needle which is inserted into the demineralized region 13. The injection is made through needle 14.

Figure 2:
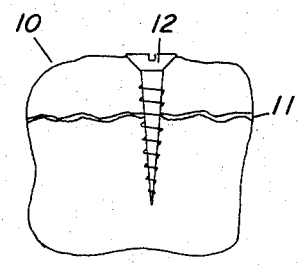

In FIG. 2, demineralized region 13 is absent around screw 13.

Figure 3:
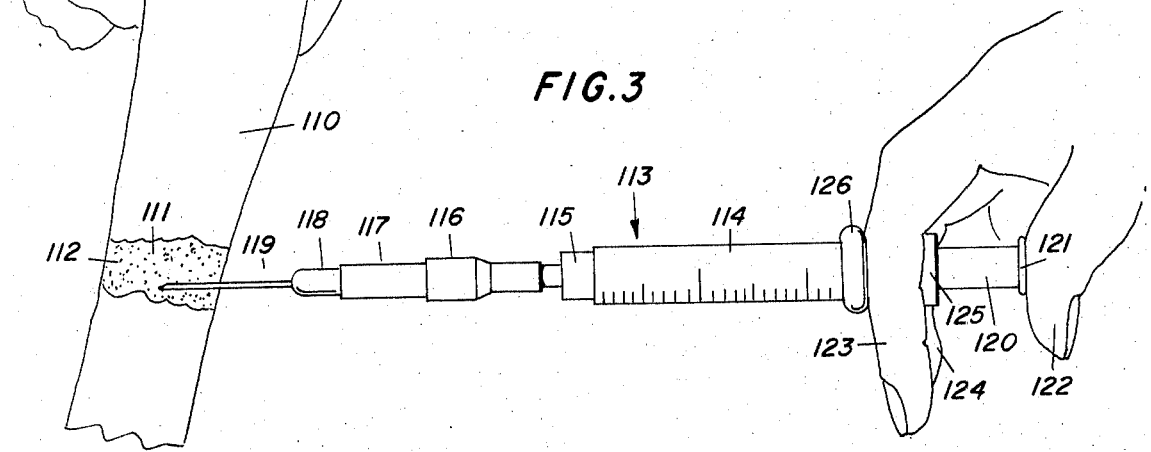

In FIG. 3, the bone is illustrated at 110, the locus of the fracture being indicated at 111 and a blood clot 112 (hematoma in periosteum). A syringe entity is indicated at 113 and includes graduated cylinder 114, which cylinder converges toward one end and is in communication with a polyvinyl tube 15 through sleeve 116. Tube 115, in turn, is in communication with nylon adapter 117, the latter emptying into a hypodermic needle socket 118, the needle being indicated at 119. The point of needle 119 is engaged in the interstice of fracture 111, as illustrated. Cylinder 114 is adapted for the reception of a fluid composition containing a non-necrotic vascular sclerosing agent. The fluid composition is forced from cylinder 114 by plunger 120, which has finger-engaging head 121. The heads are operated by thumb 122 of the uses. Two of the fingers of the user, 123 and 124, are interposed between terminal flange 125 of cylinder 114 and clamp 126 as shown in FIG. 3.

As used herein, the phrase "alien material" means metals or other substances which cause the osteolysis demineralization of the bone. Examples of such metals are iron, steel, ferrous alloys, copper alloys, aluminum, aluminum alloys, etc. The phrase "metal object" includes any object such as a screw which is metallic, and is in or contacts the bone. The metal object can be clad or coated with other substances such as chrome or stainless steels. Examples of other substances are rigid resinous materials.

The alien materials can be in the form of screws, pins, and so forth inserted in the bone in order to hold together a fractured bone or merely inserted in the bone for some other purpose (for example, as electrodes). The alien material can also be in any other form, such as, a plate attached to or in contact with the bone (for example, as a plate screwed to two vertebra where an intermediate vertebra has been removed).

The term liquefied composition includes slurries, suspensions, solutions, etc.

All of the components of the liquefied composition must be substantially non-toxic in the amounts and under the conditions of use.

The pH of the liquefied composition should be between about 8 and 11, and preferably between about 9 and about 10. Each non-necrotic vascular sclerosing agent will produce a different pH at different concentration levels, so non-toxic agents may be added to adjust the pH level, e.g., disodium hydrogen phosphate or sodium hydroxide, can be used when sodium oleate is used.

The preferred non-necrotic vascular sclerosing agent is sodium oleate.

Natural or synthetic fatty acids can be used to form the fatty acid compound. Mixtures of fatty acids can be used to form the fatty acid compound. Mixtures of fatty acids can be used.

Useful fatty acids for forming the fatty acid compounds may be saturated or unsaturated. The useful standard fatty acids are represented by the general formula: RCOOH, where R can be H, an alkyl group, branched or straight chain. Examples of useful saturated fatty acids are formic acid, acetic acid, propionic acid, n-butyric acid, isobutyric acid, N-valeric acid, n-caproic acid, n-heptoic acid, caprylic acid, n-nonylic acid, capric acid, undecylic acid, lauric acid, tridecyl acid, myristic acid, pentadecylic acid, palmitic acid, margaric acid, stearic acid, nonadecanoic acid, heneiscosanoic acid, triosanic acid, lignoceric acid, pentacosanoic acid, cerotic acid, arachidic acid and behenic acid. Examples of useful unsaturated fatty acids are oleic acid, linoleic acid, licanic acid, eleostearic acid, ricinoleic acid, clupanodonic acid and palmitoleic acid. The useful unsaturated fatty acids can be those containing one double bone, e.g., oleic acid, two double bonds, e.g., linoleic acid, three double bonds, e.g., eleostearic, acid, etc.

Useful fatty acids for forming the fatty acid salts which contain one or more hydroxyl groups are, e.g., dihydroxystearic acid. Useful hydrogenated fatty acids are cod liver oil fatty acids, tallow fat fatty acids, castor oil fatty acids, rape oil fatty acids, peanut oil fatty acids, cottonseed oil fatty acids, corn oil fatty acids, soybean oil fatty acids, linseed oil fatty acids, tung oil fatty acids, oiticia oil fatty acids, lard oil fatty acids, neat's foot oil fatty acids, whale oil fatty acids, olive oil fatty acids, coconut fat fatty acids, palm fat fatty acids, butter fat fatty acids, lard fat fatty acids and fish oil fatty acids. The useful hydrogenated fatty acids can be obtained from vegetable oils and fats, and animal oils and fats. Polymeric fatty acids can be used.

The fatty acid compound can be a fatty acid salt. The fatty acid salts can be those prepared from metals, such as, aluminum and alkaline earth metals, e.g., calcium, but are preferably those prepared by alkali metals, e.g., sodium (preferred), lithium, potassium, caesium and rubidium. (Ionic fatty acid compounds of sodium, such as, sodium oleate, are preferred, even though the potassium salts are usually more soluble.) The metals are used as hydroxides, carbonates, etc. The fatty acid salts can be prepared from ammonia and similar nonmetallic inorganic bases. The fatty acid compounds can be esterified fatty acids, e.g., methyl formate, ethyl propionate and n-amyl acetate. The fatty acid compounds can be soaps such as the reaction product of fatty acids and organic bases, e.g., methylamine, triethanolamine, monoethanolamine, diethanolamine, phenyl ethanol amine, ephedrine and pseudoephedrine. Fatty acid soaps of mono-, di- and tri-alkyl amines and aryl amines can be used.

U.S. Pat. No. 2,115,491, teaches a method of preparing the sodium salts or soaps of the fatty acids of psyllium seed oil. Amine soaps of the fatty acids can be prepared by the method taught by U.S. Pat. No. 2,090,456. U.S. Pat. No. 1,767,041 discloses a method of making the product of aklaki metals and fatty acids. The other fatty acid compounds can be made by methods readily known by those ordinarily skilled in the art.

The liquefied solutions should contain between about 0.5 and about 10 percent by weight of the fatty acid compound, and preferably contain between about 1 and about 5 percent by weight of the fatty acid compound.

Examples of specific useful compounds of fatty acids which can be used as non-necrotic vascular sclerosing agents are: sodium oleate (preferred); sodium psylliate (a mixture of the sodium salts of psyllium oil liquid fatty acids); sodium ricinoleate; ethylamine oleate; monoethanolamine oleate; sodium formate; sodium acetate and calcium propionate. Salts of fatty acids are preferred, particularily those formed from alkali metals, and the preferred fatty acid salt is sodium oleate.

Examples of other useful non-necrotic sclerosing agents are dextrose and invert sugar. (Invert sugar is a mixture of dextrose and levulose obtained by the inversion of sucrose.) Solutions containing, for example, dextrose (25 wt. percent) and sodium chloride (15 wt. percent) or invert sugar 30 wt. percent) and sodium chloride (10 wt. percent) can be used. Solutions containing about 50 percent by weight of dextrose are preferred. Solutions containing about 60 to about 75 percent by weight of invert sugar are preferred.

The fatty acid compounds (preparations) are preferred over the other useful non-necrotic vascular sclerosing agents because, for among several reasons, less of the liquefied composition (dosage) is needed. This means the less concentrated fatty acid compound preparations are needed than the more concentrated preparation such as those containing dextrose or invert sugar.

Solutions of dextrose or invert sugar or salts of fatty acids are not very irritating and do not produce necrosis.

Examples of the liquid carrier for the non-necrotic vascular sclerosing agent are water (preferred); monoglycerides; diglycerides; etc. Water is the preferred liquid carrier, and salt ($N_aCl$) can be added to make an isotonic aqueous solution as the liquid carrier.

The useful vascular sclerosing agents must be non-necrotic in affect or operation. Sclerosing agents' to be useful must not cause the pathologic death of one or more cells, or a portion of tissue or organ, resulting from irreversible damage to the nucleus.

Anodynes in amounts of up to and including about 5 percent by weight may be added. An anodyne is an agent which has the power to relieve pain. An example of a useful anodyne is benzyl alcohol. In general small amount of antiseptics or anaesthetics can be used.

Suitable preservations can be added in an amount not to exceed 0.5 percent by weight.

Up to about 5 percent, based on the weight of the total composition, of mild local anesthetics and/or antiseptics can be added. Examples of such materials are chlorobutanol and benzyl alcohol.

The composition can contain a buffering agent, such as, sodium phosphate such as secondary sodium phosphate, sodium carbonate, or the salt of a weak organic acid with a strong base of which sodium citrate is an example.

Each dosage usually contains between 0.1 and 10 c.c., depending on the size, etc., of the man or animal and the bone being treated. More particularly, the dosage usually contains between 0.2 and 5 c.c. When a horse is being treated, best results are obtained when the dosage is between 0.5 and 3 c.c.

After, before or along with the treatment of the demineralized region around the screws, pins, etc., with the vascular sclerosing anionic agent, the bone fracture, break or nonunions of the man or the animal can be treated. Preferably this additional process is conducted only after the screws, etc., have been removed. This additional process includes: aligning (only when necessary) the bone parts to position for setting; and then injecting at least one dosage of a liquefied composition comprised of a non-necrotic vascular sclerosing agent and a liquid carrier into the site of the fracture, break or nonunion area of the bone until there is a substantially complete bone union. This additional process is described in detail in my co-pending application Ser. No. 113,362, filed on Feb. 8, 1971 and titled "Method of Treating Bone Fractures and Non-Unions," the pertinent portions of which are incorporated herein by reference. Preferably another dosage is injected a week or two after the first dosage and then every week or two thereafter, as needed, until there is a substantially complete bone union. Preferably each dosage of the liquefied composition is injected into the site of the fracture, break or nonunion at its axis. By injecting a non-necrotic vascular sclerosing agent at the axis of the fracture "struts" are chemically introduced, giving rise to sheer and thus alignment. The lack of the cast not only eliminates atrophy of muscles and the complication of "lipping," but the movement of bone against the tension of muscle insertion helps to promote the flow of blood to and from the damaged area.

The non-necrotic vascular sclerosing agent can be, among other things, a fatty acid compound, e.g., a fatty acid salt or a fatty acid soap. The preferred non-nectrotic vascular sclerosing agent is sodium oleate. The preferred liquid carrier is water.

The preferred liquefied composition is comprised of 5 percent of sodium oleate, 1.5 percent of ethyl alcohol, enough disodium hydrogen phosphate to adjust the pH to 9.8 and the remainder water.

Any non-nectrotic vascular sclerosing agent and carrier described above for the treatment of osteolysis of bone by metal objects can be used.

All of the components of the liquefied compositions must be substantially non-toxic in the amounts and under the conditions of use.

The pH of the liquefied composition should be between about 8 and about 11, and preferably between about 9 and about 10. Each non-necrotic vascular sclerosing agent will produce a different pH at different concentration levels, so non-toxic agents may be added to adjust the pH level, e.g., disodium hydrogen phosphate or sodium hydroxide can be used when sodium oleate is used.

In some instances it may be necessary to use traction, but a cast as such is not needed.

Each dosage usually contains between 0.1 and 10 c.c., depending on the size, etc., of the man or animal and the bone being treated. More particularily, the dosage usually contains between 0.2 and 5 c.c. When a horse is being treated, best results are obtained when the dosage is between 0.5 and 3 c.c.

Unless otherwise stated or indicated in the following examples, all percentages, parts, proportions are expressed on a weight basis. The following examples further illustrate, but do not limit, this invention.

EXAMPLE 1

A horse was purchased at the Belmont sale and shipped to West Virginia. X-rays showed a complete transverse fracture of the sesamoid. The horse was shipped to Pennsylvania and confined to a stall for 8 months. Then a Stineman pin was inserted to hold the fracture. The Stineman pin was removed after 2 weeks and a screw was inserted. After 3½ months, healing was occuring at the fracture sight, however, demineralization (osteolysis) had begun around the screw. After 6 months the horse was sent to a track and put in light training. The horse remained sound for about 25 days and then pulled up lame. An X-ray showed that demineralization had increased (2 months after pulling up lame). The horse was shipped to my stables and X-rayed; the X-rays showed extensive demineralization around the screw. See FIG. 1. 2 c.c. of a solution of a sterile aqueous solution, containing 5 percent of sodium oleate, 1.5 percent of ethyl alcohol and enough disodium hydrogen phosphate to adjust the pH to 9.8, were injected the same day at one site of the demineralized region around the screw. Seventeen days later 2 c.c. of the sodium oleate solution was injected at one site of the demineralized region. Seven days later 1.5 c.c. of the sodium oleate solution was injected into each of two sites of the demineralized region. Thirty three days later, an X-ray was taken of the subject region and the X-ray showed that essentially complete restoration of the demineralization (ossifluent) region to healthy bone had occurred. See FIG. 2.

EXAMPLE 2

Example 1 was repeated, except that the liquefied composition containing the non-necrotic vascular sclerosing agent of Example 1 was replaced with an aqueous solution (2 c.c. ampoule) containing 5 percent ethylamine oleate and 2 percent benzyl alcohol. The ossifluent region was substantially cured in about 2 months after repeated injections.

EXAMPLE 3

Example 1 was repeated, except that the liquefied composition containing the non-necrotic vascular sclerosing agent of Example 1 was replaced with an aqueous solution (2 c.c. ampoule) containing 5 percent ethylamine oleate. The ossifluent region was substantially cured in about 2 months after repeated injections.

EXAMPLE 4

Example 1 was repeated, except that the liquefied composition containing the non-necrotic vascular sclerosing agent of Example 1 was replaced with an aqueous solution (5 c.c. vial) containing 5 percent of sodium pyslliate and 2 percent of benzyl alcohol. That aqueous solution had a pH of 8.9 (enough NaOH solution was added to achieve that level). The ossifluent region was substantially cured in about 2 months after repeated injections.

EXAMPLE 5

Example 1 was repeated, except that the liquefied composition containing the non-necrotic vascular sclerosing agent of Example 1 was replaced with an aqueous solution (2 c.c. vial) containing 5 percent of sodium pyslliate. A NaOH solution was added to obtain a pH level of 8.7. The ossifluent region was substantially cured in about 2 months after repeated injections.

EXAMPLE 6

Example 1 was repeated on a horse having a broken coffin bone. The following procedure was followed to treat the break itself. A liquefied composition containing 5 weight percent of sodium oleate, 1.5 percent of ethanol, enough disodium hydrogen phosphate to obtain a pH of 9.5 and the remainder water. The liquefied composition was placed in several 2 c.c. ampoules. One of the ampoules was used to fill a hypodermic needle syringe. The liquefied solution was injected into the axis or plane of the break of the coffin bone of the horse, the ends being held manually in alignment during the injection. See FIG. 3. No cast was used and the horse was not suspended. The treatment was not painful. X-rays indicated that "struts" (of callus along the line of stress) were produced, giving rise to sheer and thus alignment. The horse was able to "test out" the leg and successfully put minor weight in a very short time. Another injection was made on the 10th days, and about every 10 days thereafter until the fracture was substantially cured.

EXAMPLE 7

Example 6 was repeated, except that the liquefied composition containing the non-necrotic vascular sclerosing agent of Example 6 was replaced with an aqueous solution (2 c.c. ampoule) containing 5 percent ethylamine oleate and 2 percent benzyl alcohol. The fracture was substantially cured in about 3 months after repeated injections.

EXAMPLE 8

Example 6 was repeated, except that the liquefied composition containing the non-necrotic vascular sclerosing agent of Example 6 was replaced with an aqueous solution (2 c.c. ampoule) containing 5 percent ethylamine oleate. The fracture was substantially cured in about 3 months after repeated injections.

EXAMPLE 9

Example 6 was repeated, except that the liquefied composition containing the non-necrotic vascular sclerosing agent of Example 6 was replaced with an aqueous solution (5 c.c. vial) containing 5 percent of sodium physlliate and 2 percent by weight of benzyl alcohol. That aqueous solution had a pH of 8.9 (enough 10% NaOH solution was added to achieve that level). The fracture was substantially cured in about 3 months after repeated injections.

EXAMPLE 10

Example 6 was repeated except that the liquefied composition containing the non-necrotic vascular sclerosing agent of Example 6 was replaced with an aqueous solution (2 c.c. vial) containing 5 percent of sodium pyslliate. A NaOH solution was added to obtain a pH level of 8.7. The fracture was substantially cured in about 3 months after repeated injections.

This invention still further involves a third embodiment process of accelerating the death and destruction of bony cells producing unwanted new bone proliferation, say, both without and within joint capsules. This is not a surgical procedure but is accomplished by injecting a dosage of a liquefied composition comprised of a vascular sclerosing anionic agent and a liquid carrier into and around abnormal new bone proliferations. Subsequent dosages are preferably administered approximately every five days, the the injection interval depends on the density and location of the calcium deposits. This injection method is also used to remove unwanted new bone proliferations which occur immediately around the region of or in the perimeter of a broken bone (or fractured bone or non-union). This invention can be used to treat both man and animal. In a sense, this invention involves the absorption of abnormal new bone proliferation. The pertinent portions of applicant's copending application Ser. No. 123,830 are incorporated herein by reference.

Each dosage contains between about 0.1 and about 10 c.c., although a 2 c.c. dosage is normally used. The liquefied composition should contain between about 0.5 and about 5 weight percent of a vascular sclerosing anionic agent, and preferably between about 1 and about 3 percent of a vascular sclerosing anionic agent. The liquefied composition should have a pH between 6 and 10, and preferably between about 7 and about 8.1, and most preferably about 7.2.

The preferred liquefied composition is comprised of an aqueous solution of 3 weight percent of sodium tetradecyl sulfate. The preferred liquefied composition contains 2 percent of benzyl alcohol, is buffered with disodium phosphate and is adjusted with sodium dihydrogen phosphate or sodium hydroxide to a pH of about 7 to about 8.1.

The process of the third embodiment of this invention can also be used to remove arthritic spurs or deposits or growths which result from certain types of arthritis, and can further be used to perform what is commonly known as cosmetic surgery.

What is claimed is:

1. A process for the treatment of osteolysis of the region of bone around a metal object in or contacting said bone which comprises injecting at least one dosage in an effective amount of a liquefied composition comprised of a non-necrotic, fatty acid compound, vascular sclerosing agent and a liquid carrier into the ossifluent region around said metal object, said process being repeated when necessary, until there is a substantially complete curing of the ossifluent region.

2. A process as described in claim 1 wherein said metal object is a screw or pin.

3. A process as described in claim 2 wherein said screw or pin is composed of stainless steel.

4. A process as described in claim 1 wherein said non-necrotic vascular sclerosing agent is sodium oleate.

5. A process as described in claim 1 wherein said dosage is between 0.1 and 10 cc.

6. A process as described in claim 1 wherein said fatty acid compound is a fatty acid salt.

7. A process as described in claim 6 wherein said fatty acid salt is prepared from an alkali metal or basic alkali metal compound, and a fatty acid.

8. A process as described in claim 1 wherein the carrier is water.

9. A process as described in claim 1 wherein the liquefied composition is injected into the ossifluent region every week or two until there is a substantially complete curing of the ossifluent region.

10. A process as described in claim 1 wherein said liquefied composition is comprised of a non-necrotic vascular sclerosing agent which is sodium oleate, a liquid carrier which is water, ethyl alcohol and disodium hydrogen phosphate.

11. A process as describd in claim 1 wherein said metal object is a screw or pin which has been inserted in said bone to hold together a fracture, break or nonunion.

12. A process as described in claim 11 wherein, after and/or concurrently with said injections of said vascular sclerosing anionic agent, at least one dosage of a liquefied composition comprised of a non-necrotic vascular sclerosing agent and a liquid carrier is injected into the site of said fracture, break or nonunion area of bone until there is a substantially complete bone union.

13. A process as described in claim 12 wherein a dosage of said liquefied composition is injected into the site of said fracture, break or nonunion every week or two until there is a substantially complete bone union.

14. A process as described in claim 12 wherein said dosage of said liquefied composition are injected into the site of said fracture, break or nonunion at its axis.

15. A process as described in claim 12 wherein said non-necrotic vascular sclerosing agent is sodium oleate.

16. A process as described in claim 6 wherein said alkali metal is sodium.

17. A process as described in claim 6 wherein said fatty acid is oleic acid.

18. A process as described in claim 6 wherein said alkali metal is sodium, wherein said fatty acid is oleic acid, wherein said liquefied carrier is water, wherein said liquefied composition has a pH between 9 and 10, and wherein said fatty acid compound is present in an amount between about 1 and about 5 percent.

19. A process as described in claim 6 wherein said fatty acid is an unsaturated fatty acid.

20. A process as described in claim 18 wherein said liquefied composition also contains ethanol.

21. A process as described in claim 18 wherein said dosage contains 0.5 to 5 c.c. of said liquefied composition.

22. A process as described in claim 18 wherein said liquefied composition has a pH between 8 and 11.

23. A process as described in claim 6 wherein said fatty acid compound is present in an amount between about 0.5 and 10 percent.

* * * * *